3,226,326
LUBRICATING COMPOSITION
Lyman E. Lorensen, Orinda, and James W. Beardmore, Oakland, Calif., assignors to Shell Oil Company, New York, N.Y., a corporation of Delaware
No Drawing. Filed Jan. 28, 1963, Ser. No. 254,469
23 Claims. (Cl. 252—57)

This invention relates to improved hydrocarbon lubricants, and particularly to mineral lubricating oil compositions which possess good detergent-dispersant and other desired lubricating properties.

It is known that certain metal salts such as metal petroleum sulfonates, naphthenates and the like can be used as detergent or dispersants for lubricating oil compositions. Because of their tendency to form ash, these materials have been replaced in part or totally by non-ash forming detergent compounds. These non-ash forming compounds are generally polymeric compounds containing polar groups such as hydroxyl or substituted nitrogen groups in which the nitrogen-containing groups are imido, amino or amido groups derived from polymerizable nitrogen-containing compounds such as vinylpyridines, vinylpyrrolidones, amino-containing acrylates or the like. Due to the active character of such polymers they tend to react with other additives which are normally present in lubricating oil compositions or with oil decomposition products which results in inactivating the polymeric detergent and also results in sludge and varnish formation. Similar objections apply to acidic dispersant polymers.

It has now been discovered that an excellent neutral non-ash forming polymeric detergent and dispersant for lubricating oil compositions can be provided by addition to such lubricating oil compositions (0.1% to 10% by wt.) of a new and novel oil-soluble heterogeneous copolymer of a mixture of two dissimilar alkyl methacrylates represented by the formula:

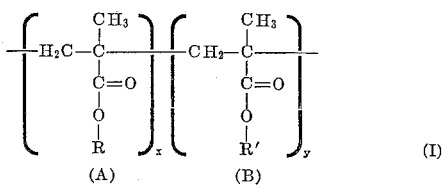

where R in the (A) portion of this copolymer is a straight-chain primary alcohol residue (alkyl radical) of at least 30 preferably 32–50 carbon atoms and R' in the (B) portion of the copolymer is a highly branched-chain alkyl radical derived from branched-chain alcohols in the molecular weight range of 800 to 1,500 (ebullisocopically determined) and $x$ and $y$ are positive integers each being at least 5 and the total molecular weight of the copolymer being in the range of 50,000 to over 2,000,000, preferably from about 100,000 to about 850,000. The randomly distributed (A) and (B) units in the copolymer can vary from 20 to 80% (A) to 80 to 20% (B) units, preferably from 40 to 60% (A) to 60 to 40% (B) units. From about 5% to about 10% of copolymer (I), (A) and (B) units can be replaced with a conventional $C_{4-20}$ alkyl methacrylate monomer mixture present in polymer form in products known under the trade name of Acryloid 150, 618, 710 and described in U.S. Patents 2,091,627, 2,604,453, 2,655,479, 2,859,450 or 2,992,987. Other lower alkyl methacrylates such as tridecyl methacrylate may be copolymerized with the (A) and (B) methacrylate mixture.

The long straight-chain alcohols having at least 30 carbon atoms and used to form the methacrylate ester units (A) of copolymers of the present invention are prepared, for example, by Oxo reaction from long-chain alpha-olefins or by the method described in "Chemistry and Engineering News," May 28, 1962, page 58, or Chem. Eng. Prog., 58, 85–88 (May 1962) and such alcohols are commercially available from Continental Oil Co. under the trade name of "Alfol" alcohols. The methacryates of this type are $C_{30-50}$ straight-chain alkyl methacrylates, A(1) $C_{34-44}$ straight-chain alkyl methacrylate, A(2) $C_{30}$ straight-chain alkyl methacrylate, A(3) $C_{34}$ straight-chain alkyl methacrylate, A(4) $C_{36}$ straight-chain alkyl methacrylate, A(5) $C_{38}$ straight-chain alkyl methacrylate, A(6) $C_{40}$ straight-chain alkyl methacrylate, A(7) $C_{42}$ straight-chain alkyl methacrylate, A(8) $C_{44}$ straight-chain alkyl methacrylate, A(9) $C_{48}$ straight-chain alkyl methacrylate, A(10) $C_{50}$ straight-chain alkyl methacrylate.

The methacryate units (B) of copolymers of the present invention are made from esters of methacrylic acid and Oxo alcohols derived from long-chain highly branched olefins such as alkanols made from the Oxo process in accordance with well known methods such as described in U.S. Patents 2,644,844 and 2,811,567, said branch chain olefins being illustrated by polyisobutylene, polymer of 3-methyl-butene-1, copolymers of polyisobutylene/butadience, copolymer of polyisobutylene/α-methyl styrene, copolymer of isobutylene/propylene tetramer, copolymer of ethylene/propylene, copolymer of ethylene/α-methyl styrene and the like. The Oxo alcohols from these olefins being in the molecular weight range of from 800 to 2,000.

Esters of type (B) include B(1) ester of methacrylic acid and Oxo alcohol of polyisobutylene (M.W. 1,500), B(2) ester of methacrylic acid and alcohol of polyisobutylene (M.W. 800), B(3) ester of methacrylic acid and Oxo alcohol of a copolymer of polyisobutylene and butadiene (M.W. 1,000), B(4) ester of methacrylic acid and alcohols of copolymer of polyisobutylene and alpha-methyl styrene (M.W. 2,000), B(5) ester of methacrylic acid and alcohols of copolymer of polyisobutylene/propylene tetramer (M.W. 2,500), B(6) ester of methacrylic acid and alcohols of copolymer of ethylene and propylene, B(7) ester of methacrylic acid and alcohols of copolymer of ethylene/α-methyl styrene and the like.

The heterogeneous copolymers of this invention are prepared by copolymerizing ester units of (A) and (B) as described by conventional means such as described in the Bruson's patent, U.S. 2,091,627, Munday's patent, U.S. 2,655,479, Heisig's patent, U.S. 2,710,842 or Galindo's patent, U.S. 2,850,450.

Specific examples of copolymers of the present invention are illustrated by the following examples which are in the molecular weight range of 200,000–800,000 (light scattering method determination): (I) copolymer of A(1) and B(1) (40/60); (II) copolymer of A(6) and B(4) (50/50); (III) copolymer of 60% mixture of A(1) and B(2) (50/50) and 40% mixture of lauryl and stearyl methacrylates; (IV) 80% of mixture of A(1) and B(4) and 20% of mixture of lauryl and stearyl methacrylate, (V) 80% of mixture of A(2) and B(5) and 20% mixture of lauryl and stearyl methacrylate, (VI) copolymer of A(1) and B(3) (50/50), (VII) copolymer of A(10) and B(1) (40/60), (VIII) copolymer of A(2), B(4) and lauryl methacrylate (20/70/10), (IX) copolymer of A(1) and B(6) (50/50), (X) copolymer of A(1) and B(7) (50/50). The commercial methacrylate ester polymers such as, "Acryloid 150, or 710" the monomer mixtures of which can be used to form copolymers with $C_{30-50}$ alkyl methacrylate mixtures of the present invention as noted above are mixtures of $C_{4-20}$ alkyl methacrylates. In the case of "Acryloid 150" sold by Rohm and Haas, it is predominately a methacrylate copolymer ester of a mixture of cetyl, lauryl and octyl alkanols and the molecular weight of the polymer is about 600,000 (light scattering method). Another commercial methacrylate copolymer of this type is sold under the trade name of "Acrylate 710" by Rohm and Haas, and the alkanols are predominately a mixture of lauryl and octyl alkanols, and the molecular weight is about 500,000.

Detergent-dispersant polymeric alkyl methacrylate mixtures of the present invention are neutral oil-soluble polymeric materials which are normally used in concentrations of from 0.1% to 10% by weight in lubricating oils. Because of their neutrality they exhibit marked advantages over polar-containing non-ash detergent polymers such as the nitrogen-containing polymers available commercially as Du Pont's "LOA–564 or 565," Rohm and Haas "Acryloid 917 or 966" which are copolymers of vinylpyrrolidone and lauryl methacrylate or Oronite's 1200 additive series, e.g., "OLOA 1200," which are imides of polyolefin succinic anhydride, or copolymer of 2-methyl-5-vinylpyridine and mixture of lauryl and stearyl methacrylate having a molecular weight of around 600,000–850,000, or acidic polymers similar to Esso's "Paratone 430 or 460," consisting of copolymers of $C_{8-20}$ alkyl acrylates or fumarates with vinyl esters and polymerizable mono or dicarboxylic organic acids or anhydrides, such as acrylic acid, methacrylic acid, citraconic acid, itaconic acid, meleic aid, fumaric acid, maleic anhydride or other types of polymerizable acidic compounds. Examples of such acidic polymeric detergent are: ($I_1$) a copolymer of vinyl acetate, maleic anhydride and mixture of n-hexadecyl and n-octadecyl fumarates prepared under conditions described in French Patent 1,228,353; ($II_1$) an acidic detergent polymer of an ethoxylated partial ester of $C_{9-18}$ alkyl maleate and vinyl acetate prepared by reacting the partial ester of $C_{9-18}$ alkyl maleate (Acid No. 90) with ethylene oxide in presence of benzoyl peroxide at around 70° C. for about an hour.

Other additives which can be used in combination with the essential polymeric additives of this invention are alkylated bisphenol having the formula:

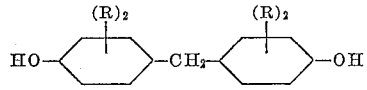

where the R's are $C_{4-8}$ tertiary alkyl groups, and can be represented by such compounds as:

1,1-bis(3,5-ditert-butyl-4-hydroxyphenyl)methane;
1,1-bis(3,5-diisopropyl-4-hydroxyphenyl)methane;
1,1-bis(3,5-di-sec-butyl-4-hydroxyphenyl)methane;
1,1-bis(3-isopropyl-5-tert-butyl-4-hydroxyphenyl) methane;
1,1-bis(3,5-di(2-oxtyl)-4-hydroxyphenyl)methane;
1,1-bis(3-sec-butyl-5(2-hexyl)-4-hydroxyphenyl)methane;
1,1-bis(2-tert-butyl-5-methyl-2-hydroxyphenyl)methane and mixtures thereof.

The bisphenols may be used in amounts of from 0.1% to 5% preferably from 0.5% to 1% by weight.

The lubricating oil compositions according to the invention can be also used in combination with small amounts of organic phosphorus-containing compounds such as alkyl, cycloalkyl, alkaryl, aralkyl, and aryl phosphites, phosphates, phosphonates and their thio-derivates, such as $C_{3-18}$ alkyl phosphiites, e.g., di and tributyl, octyl, lauryl, stearyl, cyclohexyl, benzyl, cresyl, phenyl phosphites or phosphates, as well as their thio-derivatives; $P_2S_5$-terpene reaction product; metal thio-phosphates, e.g., calcium, zinc, lead, aluminum, dialkyl dithiophosphates; organo phosphonates, e.g., dibutyl methanephosphonate, dibutyl trichloromethanephosphonate, dibutyl monochloromethanephosphonate, dibutyl chlorobenzenephosphonate, dibutyl monochloromethanephosphonate, dibutyl chlorobenzenephosphonate and the like. The esters of pentavalent phosphorus acids such as diphenyl, dicresyl, triphenyl, tricresyl, trilauryl and tristearyl phosphate and mixtures thereof are preferred.

The phosphorus compounds may be used in amounts of from 0.01% to 5%, preferably from 0.1% to 1% by weight.

Lubricating oils which can be used as base oils for the lubricating oil compositions according to the invention include a wide variety of mineral lubricating oils such as naphthenic base, paraffin base, and mixed base lubricating oils, other lubricants include, lubricating oils derived from synthetic oils, e.g., dicarboxylic acid esters (e.g. those which are prepared by esterifying such dicarboxylic acids as adipic acid, azelaic acid, suberic acid, sebacic acid, succinic acid, fumaric acid, maleic acid, pimelic acid etc., with alcohols, such as butyl alcohol, hexyl alcohol, 2-ethylhexyl alcohol, dodecyl alcohol, etc.) polyphenyls (e.g., biphenyls and terphenyls), and biphenyl ethers. These base oils may be used individually or in combination, provided the detergent additive of the present invention is readily soluble therein.

The following non-ash lubricating compositions are representative of the invention:

| | Percent by weight |
|---|---|
| Composition A: | |
| Example I copolymer | 1.5 |
| Mineral lubricating oil (SAE 20) | Balance |
| Composition B: | |
| Example II copolymer | 1.5 |
| Mineral lubricating oil (SAE 20) | Balance |
| Composition C: | |
| Example III copolymer | 1.5 |
| Mineral lubricating oil (SAE 20) | Balance |
| Composition D: | |
| Example I copolymer | 1.8 |
| Bis(3,5 - ditert - butyl - 4 - hydroxyphenyl)-methane | 0.75 |
| Mineral lubricating oil (SAE 20W–30) | Balance |
| Composition E: | |
| Example I copolymer | 1.5 |
| Bis(3,5 - ditert - butyl - 4 - hydroxyphenyl)-methane | 0.75 |
| Dicresylphosphate | 0.04 |
| Mineral lubricating oil (SAE 20) | Balance |
| Composition F: | |
| Example II copolymer | 1 |
| Bis(3,5 - ditert - butyl - 4 - hydroxyphenyl)-methane | 0.75 |
| Tricresylphosphate | 0.5 |
| Mineral lubricating oil (SAE 20) | Balance |
| Composition G: | |
| Example II copolymer | 2 |
| Bis(3,5 - ditert - butyl - 4 - hydroxyphenyl)-methane | 0.75 |
| Tricresylphosphate | 0.5 |
| Mineral lubricating oil (SAE 20) | Balance |
| Composition H: | |
| Example II copolymer | 2 |
| Bis(3,5 - ditert - butyl - 4 - hydroxyphenyl)-methane | 0.75 |
| Tricresylphosphate | 0.80 |
| Dicresylphosphate | 0.04 |
| Mineral lubricating oil (SAE 10W–30) | Balance |

Compositions of this invention were tested for their detergency and dispersancy properties by adding 0.02% carbon black to a test composition and suspending into said test oil at both ambient temperature and at 110° C. at strip of filter paper of set dimensions and observing the height and intensity of the carbon band formed on the filter paper. Compositions A, B, C, D, E and H exhibited at both temperatures detergency effectiveness of 2 to 3 times that of compositions containing convention $C_{4-20}$ alkyl methacrylate polymers such as "Acryloid 150, 618 or 710" and specifically such compositions as:

Compositions X=mineral oil+2% "Acryloid 618" copolymer,
Compositions Y=mineral oil+2% "Acryloid 150" copolymer, Compositions Z=mineral oil+2% "Acryloid 710" copolymer, Compositions XX=mineral oil+2% 2-methyl-5-vinylpyridine/lauryl methacrylate/stearyl methacrylate, Compositions YY=mineral oil+2% "Paratone 430" copolymer, Compositions ZZ=mineral oil+2% "Paratone 460" copolymer, Also in engine tests such as the LS-3 Cadillac engine test modified as follows: 100 hours, 400 repeating cycles of 15 minutes each, comprising 1 minute at 90° F. jacket temperature, 10 minutes at 135° F. jacket temperature, 2500 r.p.m. and 4 minutes at 190° F. jacket-temperature at 3200 r.p.m.; operated on high sulfur fuel, Compositions A, C, D and H passed the 100 hour test and prevented oil ring-plugging, left oil rings clean and the engine in excellent condition, whereas Compositions X, Y, Z and XX failed within 50–75 hours, especially with respect to ring-plugging.

Composition of the present invention can be used to lubricate automotive and truck engines as well as various industrial equipments such as tractors, mining equipment, etc.

We claim as our invention:

1. A lubricating oil composition comprising a major amount of lubricating oil and from about 0.1% to about 10% of a detergent-dispersant oil-soluble copolymer of a mixture of (1) $C_{32-50}$ straight-chain alkyl methacrylate and (2) a methacrylate ester of methacrylic acid and an alcohol of a highly branched-chain polyolefin having a molecular weight of from around 800 to about 1,500, the ratio of the monomers (1) and (2) varying from 40–60% to 60–40% respectively and the copolymer having a molecular weight of from about 50,000 to about 2,000,000.

2. A lubricating oil composition comprising a major amount of lubricating oil and from about 0.1% to about 10% of a detergent-dispersant oil-soluble copolymer of a mixture of (1) $C_{34-44}$ straight-chain alkyl methacrylate and (2) a methacrylate ester of methacrylic acid and a highly branched-chain alcohol of polyisobutylene having a molecular weight of from about 800 to about 1,500, the ratio of the monomers (1) and (2) varying from 40–60% to 60–40% respectively and the copolymer having a molecular weight of from about 100,000 to about 850,000.

3. A lubricating oil composition comprising a major amount of lubricating oil and from about 0.1% to about 10% of a detergent-dispersant oil-soluble copolymer of a mixture of (1) $C_{34-44}$ straight-chain alkyl methacrylate and (2) a methacrylate ester of methacrylic acid and a highly branched-chain alcohol derived from a mixture of polyisobutylene-poly-α-methyl styrene having a molecular weight of from about 800 to about 1,500, the ratio of the monomers (1) and (2) varying from 40–60% to 60–40% respectively and the copolymer having a molecular weight of from about 100,000 to about 850,000.

4. A mineral lubricating oil composition comprising a major amount of mineral lubricating oil and from about 0.1% to about 10% of a detergent-dispersant oil-soluble copolymer comprising of 60–80% of a 50–50 mixture of $C_{34-44}$ straight-chain alkyl methacrylate and a methacrylate of methacrylic acid and a highly branched-chain alcohol of polyisobutylene having a molecular weight of from about 200 to about 1,500 and 20–40% of a $C_{4-20}$ alkyl methacrylate the copolymer having a molecular weight of from about 100,000 to about 800,000.

5. A mineral lubricating oil composition comprising a major amount of mineral lubricating oil and from about 0.1% to about 10% of a detergent-dispersant oil-soluble copolymer comprising of 60–80% of a 50–50 mixture of $C_{34-44}$ straight-chain alkyl methacrylate and a methacrylate of methacrylic acid and a highly branched-chain alcohol of polyisobutylene having a molecular weight of from about 200 to about 1,500 and 20–40% of a mixture of lauryl and stearyl methacrylates, the copolymer having a molecular weight of from about 100,000 to about 800,000.

6. A mineral lubricating oil composition comprising a major amount of mineral lubricating oil and from about 0.1% to about 10% of a detergent-dispersant oil-soluble copolymer of a mixture of (1) $C_{34-44}$ straight-chain alkyl methacrylate and (2) a methacrylate ester of methacrylic acid and a highly branched-chain alcohol derived from a mixture of polyethylene-poly-α-methyl styrene having a molecular weight of from about 800 to about 1,500, the ratio of the monomers (1) and (2) varying from 40–60% to 60–40% respectively and the copolymer having a molecular weight of from about 100,000 to about 850,000.

7. A mineral lubricating oil composition comprising a major amount of mineral lubricating oil and from about 0.1% to about 10% of a detergent-dispersant oil-soluble copolymer of a mixture of (1) $C_{34-44}$ straight-chain alkyl methacrylate and (2) a methacrylate ester of methacrylic acid and a highly branched-chain alcohol derived from a mixture of polyethylene-polypropylene having a molecular weight of from about 800 to about 1,500, the ratio of the monomers (1) and (2) varying from 40–60% to 60–40% respectively and the copolymer having a molecular weight of from about 100,000 to about 850,000.

8. The composition of claim 4 containing from about 0.1% to about 5% of bisphenol having the formula

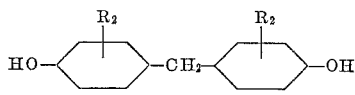

where the R's are $C_{4-8}$ tertiary alkyl groups.

9. The composition of claim 5 containing from about 0.1% to about 5% of 1,1-bis(3,5-ditertiarybutyl-4-hydroxyphenyl)methane.

10. The composition of claim 6 containing from about 0.1% to about 5% of 1,1-bis(3,5-ditertiarybutyl-4-hydroxyphenyl)methane.

11. As a new polymer, the copolymer of a mixture of (1) $C_{32-50}$ straight-chain alkyl methacrylate and (2) a methacrylate ester of methacrylic acid and an alcohol of a high branched-chain polyolefin having a molecular weight of from around 800 to about 1,500, the ratio of the monomers (1) and (2) varying from 40–60% to 60–40% respectively and the copolymer having a molecular weight of from about 50,000 to about 2,000,000.

12. As a new polymer, the copolymer of a mixture of (1) $C_{34-44}$ straight-chain alkyl methacrylate and (2) a methacrylate ester of methacrylic acid and a highly branched-chain alcohol of polyisobutylene having a molecular weight of from about 800 to about 1,500, the ratio of the monomers (1) and (2) varying from 40–60% to 60–40% respectively and the copolymer having a molecular weight of from about 100,000 to about 850,000.

13. As a new polymer, the copolymer of a mixture of (1) $C_{34-44}$ straight-chain alkyl methacrylate and (2) a methacrylate ester of methacrylic acid and a highly branched-chain alcohol derived from a mixture of polyisobutylene-poly-α-methyl styrene having a molecular weight of from about 800 to about 1,500, the ratio of the monomers (1) and (2) varying from 40–60% to 60–40% respectively and the copolymer having a molecular weight of from about 100,000 to about 850,000.

14. As a new polymer, the copolymer of a mixture of (1) $C_{34-44}$ straight chain alkyl methacrylate and (2) a methacrylate ester of methacrylic acid and a highly branched-chain alcohol derived from a mixture of polyethylene-poly-α-methyl styrene having a molecular weight of from about 800 to about 1,500, the ratio of the monomers (1) and (2) varying from 40–60% to 60–40% respectively and the copolymer having a molecular weight of from about 100,000 to about 850,000.

15. As a new polymer, the copolymer of a mixture of (1) $C_{34-44}$ straight-chain alkyl methacrylate and (2) a methacrylate ester of methacrylic acid and a highly branched-chain alcohol derived from a mixture of polyethylene-polypropylene having a molecular weight of from about 800 to about 1,500, the ratio of the monomers (1) and (2) varying from 40–60% to 60–40% respectively and the copolymer having a molecular weight of from about 100,000 to about 850,000.

16. As a new polymer, a copolymer of 60–80% of a 50–50 mixture of $C_{34-44}$ straight-chain alkyl methacrylate and a methacrylate of methacrylic acid and a highly branched-chain alcohol of polyisobutylene having a molecular weight of from about 800 to about 1,500 and 20–40% of a $C_{4-20}$ alkyl methacrylate, the copolymer having a molecular weight of from about 100,000 to about 800,000.

17. As a new polymer, a copolymer of 60–80% of a 50—50 mixture of $C_{34-44}$ straight-chain alkyl methacrylate and a methacrylate of methacrylic acid and a highly branched-chain alcohol of polyisobutylene having a molecular weight of from about 800 to about 1,500 and 20–40% of a mixture of lauryl and stearyl methacrylate, the copolymer having a molecular weight of from about 100,000 to about 800,000.

18. A mineral lubricating oil composition comprising a major amount of mineral lubricating oil and containing about 1.5% of a detergent-dispersant oil-soluble copolymer of (1) $C_{34-44}$ straight chain alkyl methacrylate and (2) a methacrylate ester of methacrylic acid and a highly branched chain alcohol of polyisobutylene having a molecular weight of about 1,500, the ratio of monomers (1) and (2) being 40% and 60% respectively and the copolymer having a molecular weight of from about 100,000 to about 850,000.

19. A mineral lubricating oil composition comprising a major amount of mineral lubricating oil and containing about 1.5% of a detergent-dispersant oil-soluble copolymer mixture consisting of 60% of a copolymer of $C_{34-44}$ straight-chain alkyl methacrylate and 40% of a copolymer of a methacrylate ester of methacrylic acid and a highly branched-chain alcohol of polyisobutylene having a molecular weight of about 800, said copolymer mixture having a molecular weight of from about 100,000 to about 850,000.

20. A mineral lubricating oil composition comprising a major amount of mineral lubricating oil and containing about 1.5% of a detergent-dispersant oil-soluble copolymer of (1) $C_{40}$ straight chain alkyl methacrylate and (2) a methacrylate ester of methacrylic acid and a highly branched chain alcohol of polyisobutylene having a molecular weight of about 800, the ratio of monomers (1) and (2) being in about a 50/50 mixture and the copolymer having a molecular weight of from about 100,000 to about 850,000.

21. A mineral lubricating oil composition comprising a major amount of mineral lubricating oil and containing about 1.5% of a detergent-dispersant oil-soluble copolymer of (1) $C_{40}$ straight chain alkyl methacrylate and (2) a methacrylate ester of methacrylic acid and a highly branched-chain alcohol of polyisobutylene alpha-methylstyrene having a molecular weight of about 2000, the ratio of monomers (1) and (2) being about 50:50 and the copolymer having a molecular weight of from about 100,000 to about 850,000.

22. The composition of claim 18 containing about 0.75% bis(3,5-ditertbutyl-4-hydroxyphenyl)methane and the copolymer is present in an amount of about 1.8%.

23. The composition of claim 20 containing about 0.75% bis(3,5 - ditertbutyl - 4 - hydroxyphenyl)methane, 0.80% tricresyl phosphate and 0.4% dicresyl phosphate.

References Cited by the Examiner
UNITED STATES PATENTS

| | | | |
|---|---|---|---|
| 2,091,627 | 8/1937 | Burson | 252—56 X |
| 2,604,453 | 7/1952 | Popkin | 252—56 |
| 2,807,653 | 9/1957 | Filbey et al. | 252—52 X |
| 3,001,942 | 9/1961 | Mulvaney et al. | 252—56 |

OTHER REFERENCES

"Ind. & Eng. Chemistry," volume 41, No. 5, pages 918–923 and 952–959.

DANIEL E. WYMAN, *Primary Examiner.*

JOSEPH R. LIBERMAN, *Examiner.*